W. B. ANDERSON.
BEARING FOR SHAFTS AND AXLES.
APPLICATION FILED DEC. 22, 1909.

1,044,000.

Patented Nov. 12, 1912.

WITNESSES:
Thos. W. Riley
M. Newcomb

INVENTOR
W. B. Anderson
BY
W. J. Fitzgerald & Co.
Attorneys

UNITED STATES PATENT OFFICE.

WILLIAM B. ANDERSON, OF EVERETT, MASSACHUSETTS.

BEARING FOR SHAFTS AND AXLES.

1,044,000.  Specification of Letters Patent.  Patented Nov. 12, 1912.

Application filed December 22, 1909. Serial No. 534,481.

*To all whom it may concern:*

Be it known that I, WILLIAM B. ANDERSON, a citizen of the United States, residing at Everett, in the county of Middlesex and State of Massachusetts, have invented certain new and useful Improvements in Bearings for Shafts and Axles; and I do hereby declare the following to be a full, clear, and exact description of the invention, such as will enable others skilled in the art to which it appertains to make and use the same.

My invention relates to new and useful improvements in bearings or bushings for shafts and axles, particularly those used for power transmission, engines, railroad car axles, the hubs of wagons and also more particularly for shafts and wheels of automobiles and the like.

An object of my invention is to provide a bearing which will be self lubricating and a still further object is to provide a bearing which is dust proof.

A still further object of my device is to provide a bearing which will lubricate the member working in said bearing at the point where said member enters the bearing.

A further object is to provide slots disposed along the interior wall of the bearing in such a manner as to prevent the longitudinal movement of the same.

These and other objects will be hereinafter more particularly referred to and pointed out in the specification and claim.

Figure 1:
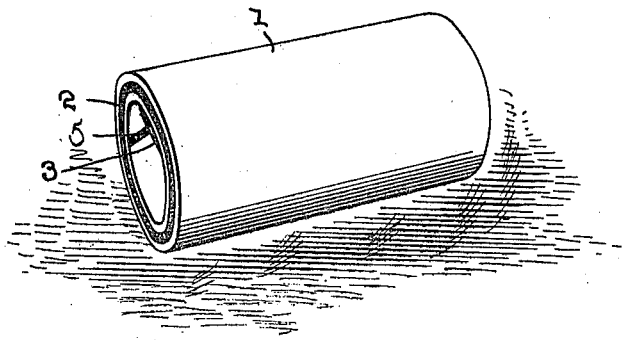
Figure 2:
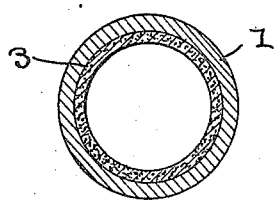
Figure 3:
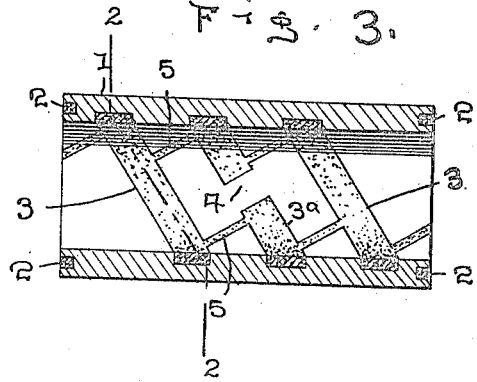

In the drawing forming a part of this application, Figure 1 is a perspective view showing one end of the bearing with a groove therein, containing lubricating material. Fig. 2 is a sectional view taken on the line 2—2 of Fig. 3, and Fig. 3 is a longitudinal sectional view of my improved bearing.

Referring to the drawing in which similar reference numerals designate corresponding parts throughout the several views, 1 is a hollow bearing preferably cylindrical and having an annular groove 2, at either end, while a plurality of circumferential grooves 3 and 3ª are disposed on the surface of the walls inclosing the hollow portion of the bearing. The grooves 3 are spirally arranged and extend continuously throughout the surface of the inclosing walls, while the grooves 3ª, although being arranged spirally only extend for a portion of their length throughout the surface of the inclosing walls, terminating at the bridges 4, said bridges being diametrically opposite to each other. The purpose of arranging the bridge members at about the longitudinal center of the inclosing walls of the hollow portion of said bearing is to overcome the longitudinal movement of said bearing which would ordinarily be caused by the spiral shape of the grooves. It is to be understood that the grooves 3 and 3ª are to contain some form of lubricant for the purpose of supplying said lubricant to the member operating within said bearing, while the grooves 2 supply a lubricant at the end of said bearing.

Referring to Fig. 2, it will be seen that the connecting grooves are positioned at right angles to each of the grooves 3 and 3ª, terminating therein, and are designed to not only contain some lubricant but also to provide a means for supplying lubricant from one groove to another, in case at any time the lubricant should become exhausted from one groove. It will be also noted that the grooves 5 connect with the grooves 2, and in so doing, are capable of giving to or receiving from said grooves 2, the lubricant carried therein.

It will therefore be seen that I have provided a bushing or bearing which may be cheaply and readily constructed and also one having a novel arrangement of lubricant containing grooves so positioned as to prevent the longitudinal movement of the bearing, when the latter is brought into operation. It might be well to state also that after the grooves have once been filled, it is not necessary to renew the lubricant in said grooves since the lubricant will last as long as the bearing itself. Since the bearing may be so cheaply constructed, it is possible to discard said bearing when it becomes so worn that all the lubricant contained therein has been used.

What I claim is:—

In a journal bearing, a hollow cylinder having helical grooves therein for retaining lubricating material, said grooves being interposed by bridges, each groove being connected to the adjacent helical grooves by short channels each of which extends at right angles to said grooves terminating in the grooves connected thereby, certain of said short channels being adjacent to said bridges, substantially as shown.

In testimony whereof I have signed my name to this specification in the presence of two subscribing witnesses.

WILLIAM B. ANDERSON.

Witnesses:
 ANNA E. DAY,
 NELSON P. BROWN.